(12) United States Patent
Toft et al.

(10) Patent No.: US 12,092,079 B2
(45) Date of Patent: Sep. 17, 2024

(54) WIND TURBINE OPERATION IN EXTREME WIND CONDITIONS

(71) Applicant: Siemens Gamesa Renewable Energy A/S, Brande (DK)

(72) Inventors: Henrik Stensgaard Toft, Copenhagen (DK); Soeren Trabjerg Brun, Jelling (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/021,239

(22) PCT Filed: Jul. 27, 2021

(86) PCT No.: PCT/EP2021/070927
§ 371 (c)(1),
(2) Date: Feb. 14, 2023

(87) PCT Pub. No.: WO2022/037907
PCT Pub. Date: Feb. 24, 2022

(65) Prior Publication Data
US 2023/0296077 A1  Sep. 21, 2023

(30) Foreign Application Priority Data
Aug. 17, 2020 (EP) .................................. 20191328.2

(51) Int. Cl.
*F03D 7/02* (2006.01)
*F03D 7/04* (2006.01)

(52) U.S. Cl.
CPC .......... *F03D 7/0204* (2013.01); *F03D 7/043* (2013.01); *F05B 2270/32* (2013.01); *F05B 2270/329* (2013.01); *F05B 2270/332* (2013.01)

(58) Field of Classification Search
CPC ...... F03D 7/0204; F03D 7/181; F03D 7/0202; F05B 2270/32; F05B 2270/329
See application file for complete search history.

(56) References Cited

U.S. PATENT DOCUMENTS 9,745,958 B2   8/2017  Agarwal et al.
2009/0263245 A1  10/2009  Shi et al.
(Continued)

OTHER PUBLICATIONS

International Search Report for PCT/EP2021/070927 issued on Nov. 5, 2021.
(Continued)

*Primary Examiner* — Courtney D Heinle
*Assistant Examiner* — John S Hunter, Jr.
(74) *Attorney, Agent, or Firm* — Schmeiser, Olsen & Watts LLP

(57) ABSTRACT

A wind turbine is provided including: i) a tower, ii) a nacelle coupled to the tower, iii) a yaw system arranged between the tower and the nacelle and configured to move the nacelle with respect to the tower, iv) an orientation determination device, configured to detect a current relative orientation between the nacelle and the wind direction to obtain an alignment parameter, v) a wind parameter determination device, configured to detect a current wind parameter to obtain a wind parameter, and vi) a control system being configured to: a) receive the alignment parameter and the wind parameter to obtain a load criterion, b) provide a maximum load criterion based on a maximum misalignment criterion that is different for at least two different wind parameters, c) determine, if the load criterion fulfills the maximum load criterion, and d) control the yaw system based on the determination result.

13 Claims, 2 Drawing Sheets

(56) References Cited

U.S. PATENT DOCUMENTS

2012/0201675 A1  8/2012  Friedrich
2016/0252075 A1  9/2016  Krüger et al.

OTHER PUBLICATIONS

Written Opinion for PCT/EP2021/070927 issued on Nov. 5, 2021.
International Preliminary Report on Patentability for PCT/EP2021/070927 issued on Jul. 13, 2022.

WIND TURBINE OPERATION IN EXTREME WIND CONDITIONS

CROSS-REFERENCE TO RELATED APPLICATIONS

This application claims priority to PCT Application No. PCT/EP2021/070927, having a filing date of Jul. 27, 2021, which claims priority to European Application No. 20191328.2, having a filing date of Aug. 17, 2020, the entire contents both of which are hereby incorporated by reference.

FIELD OF TECHNOLOGY

The following relates to a wind turbine with a yaw system, wherein the yaw system is controlled based on a determined load criterion. The following further relates to a method of operating the wind turbine, in particular in extreme wind conditions.

BACKGROUND

It may be considered as the common practice to establish wind turbines within especially windy environment, e.g., off-shore, in order to yield an efficient power production. However, strong winds (in particular, in extreme wind conditions, e.g., wind speed above 35 m/s) can cause severe and extreme loads to the blades and/or the tower of a wind turbine. Therefore, a functionality in a wind turbine, which can compensate for extreme wind conditions and/or loading, may be considered as necessary.

Conventionally, the nacelle position relative to the wind direction is adjusted in order to keep the turbine loads within the wind turbine (design) limit (and not to cause damage to the wind turbine). The adjustment of the nacelle orientation to the wind direction requires hereby an activation of the turbine yaw system which moves the nacelle relative to the tower of the wind turbine.

However, the activation and application of the yaw system always causes wear (of heavy machine parts) and a high-power consumption. In particular, in situations when the wind turbine is not connected to the grid (off-grid), the power necessary for the yaw system has to be provided from a power back-up system (e.g., a battery, a generator, etc.). This is especially important in the case of extreme wind conditions, when the wind turbine is generally off-grid and does not produce power.

So far, this issue is solved by supervising a misalignment between the wind direction and the nacelle orientation. In case that the current alignment between wind direction and the nacelle orientation is larger than the maximum allowable misalignment, then the yaw system is activated and moves the nacelle to a position, wherein the alignment is below the maximum allowable misalignment.

FIG. 3 shows an example from the conventional art (see line 350), wherein the maximum allowable misalignment is set to 8° (see the IEC 61400-1 standard). An alignment angle between the wind direction and the nacelle orientation of essentially 0° would be perfect for reducing the load that acts on the wind turbine. In case that the current alignment angle is, however, larger than the maximum allowable misalignment (i.e., 8°), the yaw system is activated and the nacelle is moved towards a position, wherein the alignment angle between wind direction and nacelle orientation is below 8°.

A disadvantage if this strategy is, however, that the yaw system has to be activated frequently so that a constant wear of heavy machine parts and a high-power consumption (in extreme wind conditions the wind turbine can be off-grid and the power back-up system has to be applied) is caused.

There may be a need for providing a wind turbine that operates (in particular under extreme wind conditions) in a secure and an energy-efficient manner.

SUMMARY

According to an aspect of embodiments of the invention, a wind turbine is described. The wind turbine comprises:
i) a tower,
ii) a nacelle coupled to the tower, and
iii) a yaw system arranged between the tower and the nacelle and configured to move the nacelle with respect to the tower. The wind turbine further comprises:
iv) an orientation determination device, configured to determine (measure or estimate) a current relative orientation (e.g., an alignment information such as an angle between the wind direction and the orientation of the nacelle) between the nacelle and the wind direction to obtain an alignment parameter (e.g., an angle),
v) a wind parameter determination device, configured to determine (measure or estimate) a current wind parameter (e.g., the wind speed) to obtain a wind parameter (for example the wind speed in m/s or km/h), and
vi) a control system (coupled to the yaw system) being configured to:
a) receive the alignment parameter and the wind parameter to obtain a load criterion,
b) provide a (predetermined) maximum load criterion based on a maximum misalignment criterion that is different for at least two different wind parameters,
c) determine, if the load criterion fulfills the maximum load criterion (i.e., if a threshold is fulfilled), and
d) control the yaw system based on the determination result (i.e., the comparison between the predetermined maximum load criterion and the current/measured load criterion).

According to a further aspect of embodiments of the invention, a method for controlling a wind turbine (in particular as discussed above) is described. The wind turbine comprises a tower, a nacelle coupled to the tower, and a yaw system arranged between the tower and the nacelle and configured to move the nacelle with respect to the tower. The method comprises:
i) determining a current relative orientation (alignment) between the nacelle and the wind direction to obtain an alignment parameter,
ii) determining a current wind parameter to obtain a wind parameter,
iii) obtaining a load criterion based on the alignment parameter and the wind parameter,
iv) providing a maximum load criterion based on a maximum misalignment criterion that is different for at least two different wind parameters,
v) determining, if the load criterion fulfills the maximum load criterion, and
vi) controlling the yaw system based on the determination result.

In the context of this document, the term "load criterion" may refer to the load that currently acts on the nacelle and/or wind turbine. Hereby, the load criterion may be experimentally determined (measured) or estimated. The load acting on the wind turbine may be based on the relative orientation (alignment) between the wind direction and the nacelle orientation. Further, the load may be dependent on the current conditions of the wind, i.e., wind parameters such as the wind speed.

In the context of this document, the term "maximum load criterion" may refer to a predetermined (theoretical) maximum allowable load on the nacelle and/or wind turbine. While conventionally only the alignment has been considered (and the nacelle has to be constantly adapted to the wind direction), the described maximum load criterion depends also on the wind parameters and is different for different wind parameters. Hence the maximum load criterion depends not only on the alignment but also on the wind parameters.

According to an exemplary embodiment, the invention may be based on the idea that a wind turbine can be operated (in particular in extreme wind conditions) in a secure and energy-efficient manner, when the yaw system of the wind turbine is activated only in case that a maximum load criterion is fulfilled, i.e., when a yaw reaction is inevitable. The maximum load criterion is hereby based on a maximum misalignment criterion that is different for at least two different wind speeds.

Conventionally, only the alignment between the wind direction and the nacelle orientation has been taken into account for controlling the yaw system (under extreme wind conditions). However, the constant re-orientation of the nacelle by the yaw system causes heavy wear and a high energy consumption.

It has been found by the inventors that the wind turbine can be operated more energy-efficiently while still being secure, when further parameters such as the current wind speed are taken into account, when providing a maximum load criterion. This is because the load on a wind turbine depends on both, the orientation alignment and the wind parameters, therefore the described maximum load criterion enables an especially dynamic operation of a wind turbine even under extreme wind conditions.

By applying the inventive concept, there will be significantly less wear and power consumption caused by the yaw system, even when operating save under extreme wind conditions. As a further advantage, a smaller power back-up system is needed which is still able to keep the turbine loads within the wind turbine (design) limit during extreme wind conditions.

Even in very high (extreme) wind speeds (which are above the wind speed limits where production is stopped due to the load), a wind turbine in a first wind speed (non-production, i.e., the first wind speed is higher than a production wind speed) does not need to be as aligned with the wind direction in the same manner as in a second (high/extreme, non-production) wind speed, being significantly higher than the first wind speed (the pressure from the wind scales the wind speed squared) in order to keep the load within the design limit (and not cause damage). Thus, according to the described yaw strategy, there is no adjusting of the nacelle position relative to the wind direction unless this is inevitable to keep the wind turbine loads within the optimum limit.

According to an embodiment, the maximum misalignment criterion is distinct for a plurality, in particular at least three, different wind parameters. This may provide the advantage that also complex relationships between the alignment and the wind parameters can be implemented (e.g., constant plateaus and dynamic changes). As a consequence, the described wind turbine can be operated especially efficiently.

According to a further embodiment, the control system is further configured to: i) in case that the load criterion fulfills the maximum load criterion, initiate a yaw system reaction, and/or ii) in case that the load criterion does not fulfill the maximum load criterion, not initiate the yaw system reaction. In this manner, the energy-consuming and wear-causing yaw system is only activated, when it is absolutely necessary (inevitable) to guarantee a secure operation.

According to a further embodiment, the yaw system is configured to move the nacelle with respect to the tower as a yaw reaction. Thereby, a dangerous misalignment can be compensated using established means.

According to a further embodiment, the yaw system is configured to move the nacelle so that the load criterion does not fulfill the maximum load criterion anymore. Also with this measure, a dangerous misalignment can be compensated using established means.

According to a further embodiment, the alignment parameter comprises an alignment, in particular an angle, between the wind direction and the nacelle orientation. This enables to obtain a reliable orientation using established technologies.

According to a further embodiment the wind parameter comprises a measured wind speed and/or an estimated wind speed. A wind speed can be efficiently measured for example using a wind speed detector/sensor and may hence be a suitable wind parameter.

According to a further embodiment, the control system is further configured to: i) provide a first maximum misalignment criterion for a first wind speed, and ii) provide a second maximum misalignment criterion for a second wind speed. Hereby, the second wind speed is higher than the first wind speed, and the first maximum misalignment criterion is different from the second maximum misalignment criterion.

According to a further embodiment, the first maximum misalignment criterion is broader (for example the allowed angle is larger) than the second maximum misalignment criterion.

According to a further embodiment, the first wind speed and the second wind speed is a non-production wind speed, in particular an extreme wind speed.

These measures may provide the advantage that the yaw system is essentially not activated in a lower non-production wind speed, while there are more activations of the yaw system under extreme non-production wind conditions. Thus, wear is "saved" in high (non-production) wind speeds and may be used in production wind speeds. Additionally, or alternatively, more economic components can be applied.

According to a further embodiment, the first wind speed is (essentially) in the range 25 to 35 m/s (in particular 25 to 30 m/s); and/or the second wind speed is (essentially) higher than 30 m/s (in particular higher than 35 m/s, more in particular higher than 40 m/s). The second wind speed may be in the range 35 to 50 m/s).

According to a further embodiment, the first maximum misalignment criterion comprises an angle of at least 15° (in particular at least 20°); and/or the second maximum misalignment criterion comprises an angle being lower than 20°, in particular lower than 15°, more in particular lower than 10°.

According to a further embodiment, the wind turbine comprises an off-grid power back-up system (e.g., a battery, a generator, etc.). In particular this off-grid power back-up system is smaller and/or less costly than a conventional off-grid power back-up system for a conventional wind turbine of essentially the same size as the described wind turbine. In other words, the off-grid power back-up system of the described wind turbine is a reduced-size (and/or reduced-cost) off-grid power back-up system.

In the case of high/extreme wind speeds, the wind turbine does not produce power anymore. Hence, in order to control e.g., the yaw system, a power back-up system is necessary. According to the described new yaw strategy, the yaw system is only activated, when this is inevitable with respect to the load acting on the wind turbine. As a consequence, a more cost- and energy-efficient (i.e., smaller) off-grid back-up system can be applied for the described wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
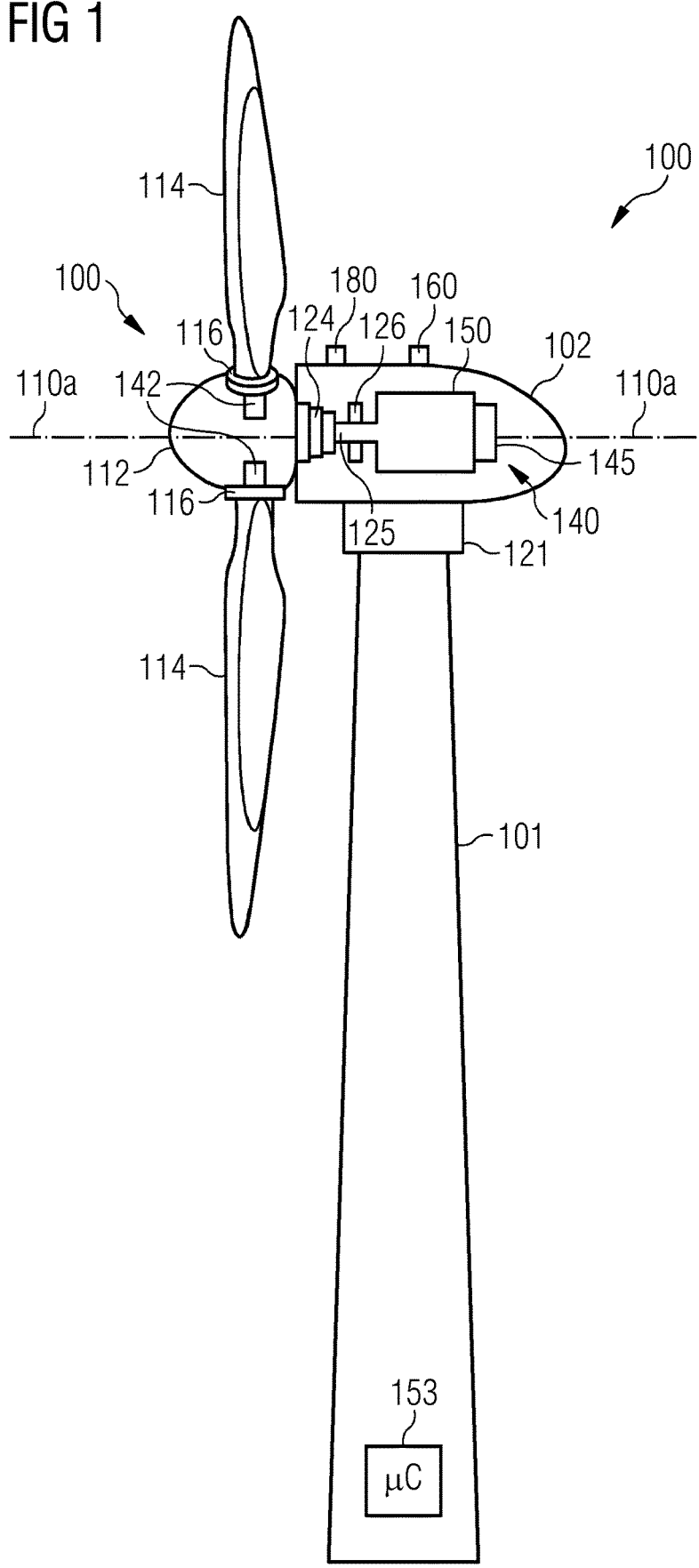
FIG. 1 shows a wind turbine according to an exemplary embodiment of the invention.

According to an exemplary embodiment, the described yaw control strategy specifies/determines the maximum acceptable yaw misalignment (maximum load criterion) dependent on the measured or estimated wind speed (wind parameter). The wind direction will, during extreme wind conditions, vary due to natural variations in the wind and general movements of the weather system. This will cause that the yaw error (alignment parameter) exceeds the allowed yaw error (maximum misalignment criterion) after which the yaw system will activate and adjust the nacelle position to the wind direction. Conventionally, the activation of the yaw system causes wear and consumes power either from the electrical grid or a power back-up system. The fewer activations of the yaw system according to the described method causes that a smaller power back-up system is needed. The increased allowed yaw error at low wind speeds will cause fewer activations of the yaw system and hence less wear and power consumption without turbine loads exceeding the design limit.

According to an exemplary embodiment, the described yaw control strategy will normally be applied for wind speeds between 25 and 50 m/s and a yaw error (misalignment) between 0° and 30°. However, higher wind speed and yaw errors can be considered. The constant plateau at high wind speeds is for example defined by the design requirements in the design standard IEC 61400-1, whereas the plateau at low wind speeds is e.g., defined by vortex induced vibrations etc.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously, though, all such spatially relative terms refer to the orientation shown in the figures for ease of description and are not necessarily limiting as an apparatus according to an embodiment of the invention can assume orientations different than those illustrated in the figures when in use.

FIG. 1 shows a wind turbine 100 according to an embodiment of the invention. The wind turbine 100 comprises a tower 101 which is mounted on a non-depicted fundament. On top of the tower 101 there is arranged a nacelle 102. In between the tower 101 and the nacelle 102 there is provided a yaw system 121. The yaw system comprises a yaw angle adjustment device which is capable of rotating the nacelle 102 around a non-depicted vertical axis being aligned with the longitudinal extension of the tower 101. By controlling the yaw angle adjustment device in an appropriate manner, it can be made sure that during a normal operation of the wind turbine 100 the nacelle 102 is properly aligned with the current wind direction.

The wind turbine 100 further comprises a wind rotor 110 having three blades 114. In the perspective of FIG. 1 only two blades 114 are visible. The rotor 110 is rotatable around a rotational axis 110a. The blades 114, which are mounted at a hub 112, extend radially with respect to the rotational axis 110a.

In between the hub 112 and a blade 114 there is respectively provided a blade angle adjustment device 116 in order to adjust the blade pitch angle of each blade 114 by rotating the respective blade 114 around a non-depicted axis being aligned substantially parallel with the longitudinal extension of the respective blade 114. By controlling the blade angle adjustment device 116 the blade pitch angle of the respective blade 114 can be adjusted in such a manner that at least when the wind is not too strong (production conditions) a maximum wind power can be retrieved from the available mechanical power of the wind driving the wind rotor 110.

As can be seen from FIG. 1, within the nacelle 102 there is provided a gear box 124. The gear box 124 is used to convert the number of revolutions of the rotor 110 into a higher number of revolutions of a shaft 125, which is coupled in a known manner to an electromechanical transducer 140. The electromechanical transducer is a generator 140.

At this point it is pointed out that the gear box 124 is optional and that the generator 140 may also be directly coupled to the rotor 110 by the shaft 125 without changing the numbers of revolutions. In this case the wind turbine is a so-called Direct Drive (DD) wind turbine.

In accordance with basic principles of electrical engineering the generator 140 comprises a stator arrangement 145 and a rotor arrangement 150.

Further, a brake 126 is provided in order to stop the operation of the wind turbine 100 or in order to reduce the rotational speed of the rotor 110 for instance in case of emergency.

The wind turbine 100 further comprises a control system 153 for operating the wind turbine 100 in a highly efficient manner (see FIG. 2 below). Apart from controlling for instance the yaw system 121, the depicted control system 153 may also be used for adjusting the blade pitch angle of the rotor blades 114 in an optimized manner.

An orientation determination device 160 and a wind parameter determination device 180 are shown schematically at the nacelle 102. However, these devices 160, 180 may be applied in a flexible manner, for example at other positions of the wind turbine 100. The same holds true for the control system 153. The devices 160, 180 and the control system 153 may be realized as single components or as several components, respectively.

Figure 2:
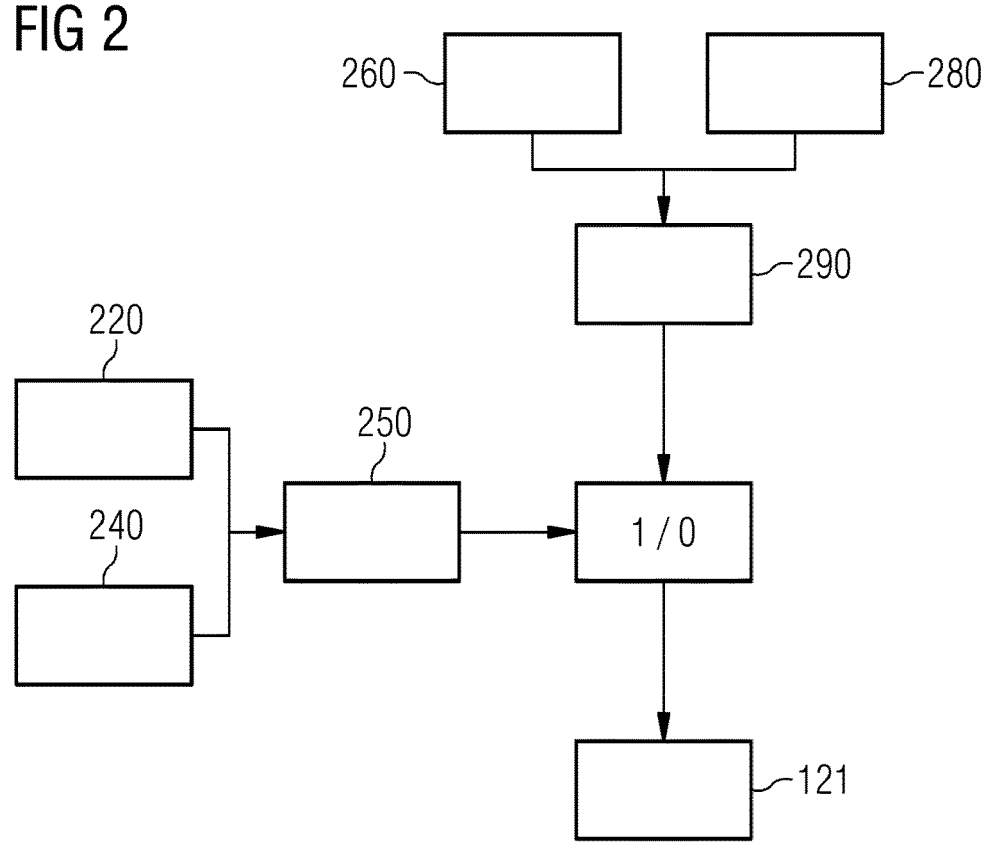
FIG. 2 shows a method of controlling a wind turbine according to an exemplary embodiment of the invention.

FIG. 2 shows a method of controlling a wind turbine 100 according to an embodiment of the invention. A current relative orientation between the nacelle and the wind direction is determined (measured) to obtain an alignment parameter 260. Further, a current wind parameter 280 is determined (measured and/or estimated). Both parameters 260, 280 may be considered as a load criterion 290 since the load on the nacelle (and wind turbine) depends on the alignment with respect to the wind direction and the wind properties (in particular wind speed).

A maximum load criterion 250 is further determined, either by the control system 153 itself or by another control system that is in communication with the control system 153. The maximum load criterion 250 is based on a maximum misalignment criterion 220. In contrast to conventional art methods, the maximum misalignment criterion 220 is not the same for different wind parameters 240 but is instead different for at least to different wind parameters 240 such as different wind speeds. While the load criterion 290 is a current (experimentally determined) parameter, the maximum load criterion 250 is a predetermined (theoretical) parameter. The load criterion 290 is compared with the maximum load criterion 250 and it is determined, if the load criterion 290 fulfills the maximum load criterion 250 (shown as "1") or if the load criterion 290 does not fulfill the maximum load criterion 250 (shown as "0").

The yaw system 121 of the wind turbine 100 is then controlled based on this determination result (i.e., a yaw reaction is initiated, if necessary). In case that the maximum load criterion 250 is not fulfilled, it may not be necessary to start a yaw reaction. However, in case that the load criterion 290 fulfills the maximum load criterion 250, it may be inevitable that a yaw system 121 reaction is initiated. The yaw system 121 is configured to move the nacelle 102 with respect to the tower 101 as a yaw reaction. In particular, the yaw system 121 moves the nacelle 102 so that the load criterion 290 does not fulfill the maximum load criterion 250 anymore. This is achieved by changing the alignment of the nacelle 102 towards the wind direction, so that the maximum misalignment criterion 220 is not fulfilled anymore at the present wind speed 280.

Figure 3:
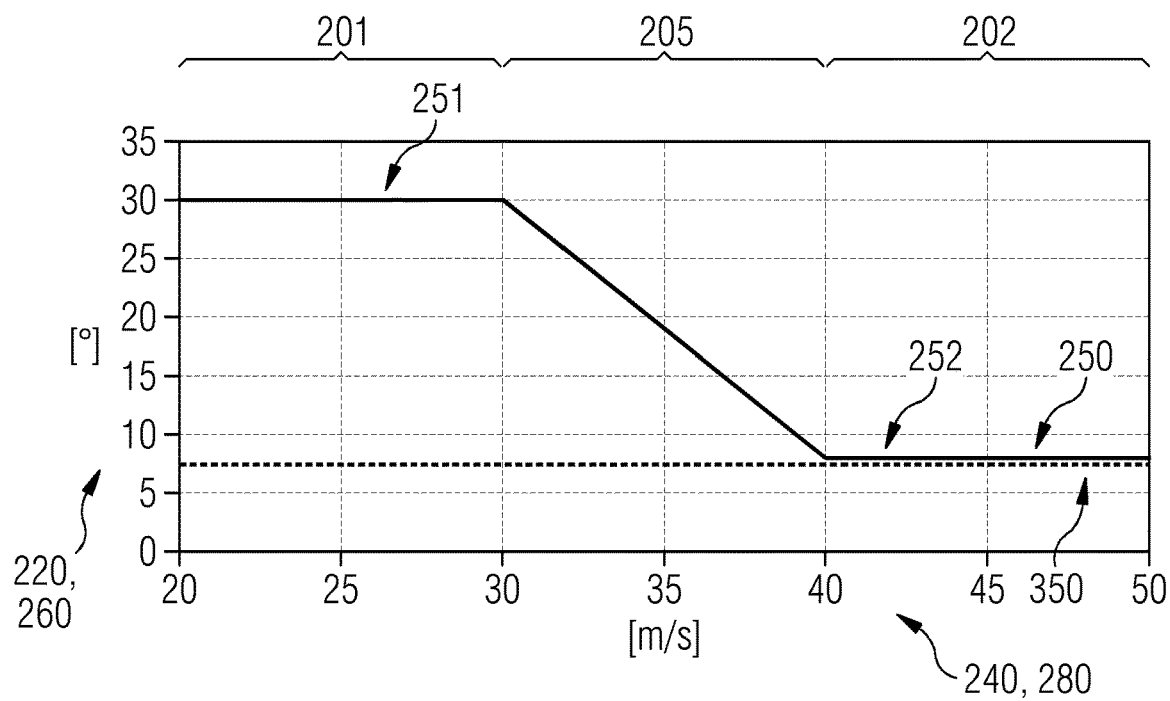
FIG. 3 shows a maximum load criterion according to an exemplary embodiment of the invention in comparison to a conventional art example.

FIG. 3 shows a maximum load criterion 250 according to an embodiment of the invention in comparison to a conventional art example. The ordinate (y-axis) shows the relative orientation (alignment) between the nacelle 102 and the wind direction as an angle, while the abscissa (x-axis) shows the wind speed (in meter per second) as a wind parameter 240. While conventionally only a maximum misalignment 350 (in the example shown the maximum misalignment is an angle of 8°) has been considered, the described method is focused on the actual load that acts on the wind turbine 100, wherein the load is based on the alignment and the wind parameters.

A first maximum misalignment criterion 251 (in the example shown 30°) is provided for a first wind speed 201 and a second maximum misalignment criterion 252 (in the example shown 8°) is provided for a second wind speed 202 (i.e., the first maximum misalignment criterion 251 is much broader than the second maximum misalignment criterion 252). The first wind speed 201 is a non-production wind speed (production can be e.g., until 25 or 28 m/s) and is much lower than the second wind speed 202, which is a non-production (extreme) wind speed. For the first wind speed 201 and for the second wind speed 202, the respective maximum misalignment criterion 251, 252 may remain the same (constant plateau).

In between the first and the second wind speed 201, 202, there is an intermediate region 205 that represents a transition between the low non-production wind speed 201 and the high non-production 202 wind speed. In this intermediate region 205, the maximum misalignment criterion 220 continually changes (is adapted) with the wind speed changes.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
a tower;
a nacelle coupled to the tower;
a yaw system arranged between the tower and the nacelle and configured to move the nacelle with respect to the tower; and
a control system being configured to:
receive an alignment parameter, which is obtained from a current relative orientation between the nacelle and a wind direction, and a current wind parameter to obtain a load criterion,
provide a maximum load criterion based on a maximum misalignment criterion that is different for at least two different wind parameters,
determine, if the load criterion fulfills the maximum load criterion, and
control the yaw system based on the determination result;
wherein the wind parameter comprises a measured wind speed and/or an estimated wind speed, and
wherein the control system is further configured to:
provide a first maximum misalignment criterion for a first wind speed, and
provide a second maximum misalignment criterion for a second wind speed;

wherein the second wind speed is higher than the first wind speed, wherein the first maximum misalignment criterion is different from the second maximum misalignment criterion, and wherein the first wind speed and the second wind speed is an extreme wind speed, the extreme wind speed being a non-production wind speed.

2. The wind turbine according to claim 1, wherein the maximum misalignment criterion is distinct for at least three different wind parameters.

3. The wind turbine according to claim 1, wherein the control system is further configured to:
  in case that the load criterion fulfills the maximum load criterion, initiate a yaw system reaction; and/or
  in case that the load criterion does not fulfill the maximum load criterion, not initiate the yaw system reaction.

4. The wind turbine according to claim 3, wherein the yaw system is configured to move the nacelle with respect to the tower as a yaw reaction.

5. The wind turbine according to claim 4, wherein the yaw system is configured to move the nacelle so that the load criterion does not fulfill the maximum load criterion anymore.

6. The wind turbine according to claim 1, wherein the alignment parameter comprises an angle between the wind direction and the nacelle orientation.

7. The wind turbine according to claim 1, wherein the first maximum misalignment criterion is broader than the second maximum misalignment criterion.

8. The wind turbine according to claim 1, wherein the first wind speed is in the range 25 m/s to 35 m/s.

9. The wind turbine according to claim 1, wherein the second wind speed is higher than 35 m/s.

10. The wind turbine according to claim 1, wherein the first maximum misalignment criterion comprises an angle of at least 20°.

11. The wind turbine according to claim 1, wherein the second maximum misalignment criterion comprises an angle being lower than 20°.

12. The wind turbine according to claim 1, wherein the wind turbine comprises an off-grid power back-up system.

13. A method for controlling a wind turbine, wherein the wind turbine comprises a tower, a nacelle coupled to the tower, and a yaw system arranged between the tower and the nacelle and configured to move the nacelle with respect to the tower, the method comprising:
  determining a current relative orientation between the nacelle and the wind direction to obtain an alignment parameter;
  determining a current wind parameter;
  obtaining a load criterion from the alignment parameter and the wind parameter;
  providing a maximum load criterion based on a maximum misalignment criterion that is different for at least two different wind parameters;
  determining, if the load criterion fulfills the maximum load criterion;
  controlling the yaw system based on the determination result; wherein the wind parameter comprises a measured wind speed and/or an estimated wind speed; and
wherein the method further comprising:
  providing a first maximum misalignment criterion for a first wind speed;
  providing a second maximum misalignment criterion for a second wind speed;
wherein the second wind speed is higher than the first wind speed,
wherein the first maximum misalignment criterion is different from the second maximum misalignment criterion, and
wherein the method is performed at extreme wind speeds, the extreme wind speeds being a non-production wind speed.

* * * * *